3,382,654
LAWN MOWER BLADE
Abraham L. Freedlander, Dayton, Ohio, and Leland E. Williams and Dana C. Strickler, Waynesville, N.C., assignors to Dayco Corporation, Dayton, Ohio, a corporation of Delaware
Filed May 10, 1967, Ser. No. 637,401
6 Claims. (Cl. 56—295)

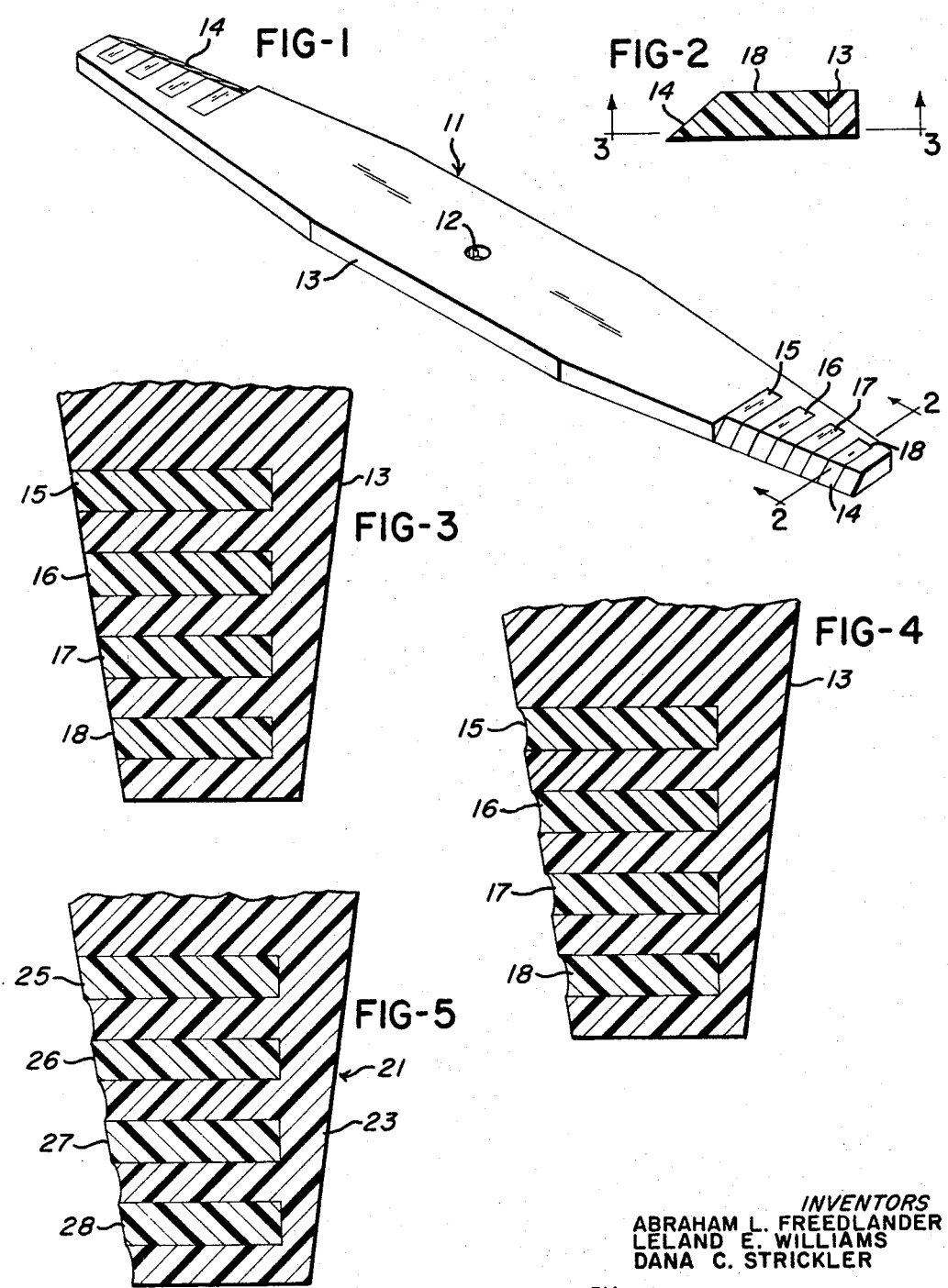

ABSTRACT OF THE DISCLOSURE

A flexible lawn mower blade for mounting on a power driven rotary lawn mower for providing safety due to the flexing of the blade when striking an object. The blade has cutting portions formed of alternating strips of dissimilar materials such as urethane elastomers and plastics, these strips extending to the cutting edge. Due to the dissimilar abrasion resistance of the materials a saw-tooth effect is formed in the cutting edge.

---

Conventional lawn mowers used by the average homeowner are usually rotary and are gasoline or electric motor operated. This type of mower is also popular for industrial mowing operations. The term "rotary" refers to a mower in which the shaft extends vertically downward from the housing and upon which the blade is mounted so that it rotates in a plane parallel to the ground. This type of mower is popular because it is simple to operate, inexpensive to build, and performs a highly satisfactory job of cutting grass and weeds. Unfortunately, however, the extremely high speeds at which such mowers operate, up to 3600 r.p.m., cause the blades to create extremely high hazards. For example, there have been many cases known where the operator's foot has accidentally slipped under the housing and has been struck by the rotating blade, causing serious injury to, and even amputation of, the foot. In addition, the conventional metal cutting blade may strike large rocks, posts, or other objects in the lawn, and the sudden shock may cause the blade to break, hurling pieces of metal at tremendous speeds to cause injury to the operator or to the persons close by. In the case of loose stones and other obstructions, these objects are also often struck by a rigid metal blade and caused to be thrown great distances to create damage to persons or property. A further disadvantage of the conventional metal blade used in the rotary mower is that it becomes dull very quickly and must be resharpened for proper efficiency.

The present invention is designed to overcome the many disadvantages recited above, while at the same retaining the advantages of the rotary type blade. The invention utilizes a blade having arms somewhat similar to those of a metal blade, but made of an elastomeric material that is sufficiently rigid to cut grass as efficiently as a metal blade, and yet sufficiently flexible to permit the blade to flex when striking an object such as a shoe. This flexing action permits the blade to ride over the object and thus avoid serious damage to the foot. This flexing is also useful if an immovable object, such as a large rock or post, is encountered, since the blade is still permitted to flex and ride over this object; at the same time, the blade has a certain amount of inherent elasticity that tends to cushion the initial shock and prevent the blade from breaking. In the case of small rocks, etc. the flexing action will somewhat cushion the initial impact and reduce the amount of speed at which these small objects are hurled. The novel blade also has the property of being able to flex repeatedly without destroying any of its properties, and also retains a cutting edge a remarkably long time. The material utilized also has the properties of elongating only a very small amount during operation and yet has sufficient elastic memory to return to its original size despite many hours of use. Despite the fact that it is elastomeric, the blade itself does not get softer during operation, but retains its initial properties that provide an excellent compromise between sufficient rigidity for cutting and sufficient flexibilty for safety. The blade is also extremely simple to manufacture and very low in cost.

In the prior art certain elastomeric or plastic materials have been illustrated, as in the patents issued to Tatum No. 3,133,398, Voight No. 3,140,510 and Ely No. 3,302,377, all of whom contemplate the use of rubber materials with additional stiffening materials such as solid particles, screens, or fabric. United States Patent No. 3,156,082 to Joyner suggests the use of a polyethylene material. Blades made solely of these materials have been tried by applicants and have been found wanting, primarily since rubber and polyethylene do not provide a satisfactory cutting edge. In addition, the rubber material cannot be used without the reinforcements mentioned, and the type of polyethylene material which is soft and flexible enough to avoid injury also requires a reinforcement. However, there are certain properties of these materials which applicants have found to be useful in combination with other materials that do have improved abrasion and elongation resistance, and it is contemplated that these materials be used in such combinations.

In our earlier patent application Ser. No. 625,657, filed Mar. 24, 1967, we have described a lawn mower blade formed of a combination of materials such as urethane elastomers and various types of plastics, these materials being used in various combinations. In every instance in our earlier application the entire cutting edge was formed of a urethane elastomer, whereas the remaining portions of the blade were formed of a urethane elastomer of dissimilar characteristics, or of a plastic material. In this earlier application one of the configurations was described as a series of alternating strips which extended transversely of the blade, but only up to the cutting edge.

The present application relates to a variation of our earlier application in which a series of transverse alternating strips is utilized which, however, extend up to and including the cutting edge. By utilizing either two dissimilar types of urethane elastomers or a urethane elastomer and a plastic material having less abrasion resistance, it is possible to obtain a cutting edge which upon wearing will create a saw-tooth effect that has a slightly different cutting action on the blades of grass. These novel principles are more fully brought out in the following specification, claims, and drawings, in which:

FIGURE 1 is a perspective view of one form of the novel blade.

FIGURE 2 is a cross-sectional view taken along line 2—2 of FIGURE 1.

FIGURE 3 is a cross-sectional view taken along line 3—3 of FIGURE 2.

FIGURE 4 is a view similar to FIGURE 3 illustrating the appearance of the cutting area upon wearing.

FIGURE 5 is a view similar to FIGURE 4 illustrating a modified form of the invention.

Referring to the drawings, FIGURE 1 illustrates a novel lawn mower blade 11 approximately rectangular in shape but beveled at its outer tips. The principal body of the blade 13 has a central mounting hole 12, while the cutting sections at the tips have cutting edges 14 as shown. The body portion 13 is formed of a urethane elastomer which may be cast or molded and which is comparatively abrasion resistant. A preferred type of urethane elastomer is formulated from a polyester or polyether based isocyanate terminated prepolymer, formed through a chain extension with selected polyols or other polyfunctional active hydrogen materials. Thus, the main portion of the body, as well as those portions which form the cutting edge, is highly flexible and yet highly abrasion resistant, as well as having superior cut and tear resistance. Interspersed with the main body material at the tips is a series of strips 15, 16, 17 and 18, which extends transversely of the blade to the cutting edges, these strips, therefore, alternating longitudinally of the blade with the principal material. As shown in the drawings, the width of the strips is approximately equal to the spacing between them. This second material which forms the strips may be a different type of polyurethane which is somewhat cheaper and less abrasion resistant; for example, a polyether based material that is an adduct of polypropylene oxide cross-linked with a diisocyanate. The other material may also be formed of a plastic material; this may a thermoplastic material such as polyethylene of high, medium or low molecular weight, polyvinyl chloride, polypropylene, nylon, ABS, polycarbonate, polyimide, polystyrene, polyphenylene oxide, acetal, or blends of these materials. Which ever material is used for these strips however, the effect of the blade and the cutting area will still remain one of flexibility to enable the blade to ride over an object which is struck.

As the blade wears during its operation, as shown in FIGURE 4, the strips 15, 16, 17 and 18 which are exposed at the cutting edge will wear faster than the principal material, since these strips have a lesser abrasion resistance. This creates the saw-tooth effect which is illustrated and provides a somewhat different cutting action than would occur with a cutting edge of a single material. By controlling the width of these strips, as well as the specific materials, the flexibility of the cutting area may be controlled. It has further been found that the use of less abrasion-resistant material provides an additional safety factor because this material creates areas of comparative softness for additional safety when striking an object such as a foot.

FIGURE 5 illustrates a modified form of the invention in which a blade 21 similar to the blade 11 is composed of a principal body portion 23 which is formed of the less abrasion-resistant urethane or formed of one of the plastic materials described above. In this case the strips 25, 26, 27 and 28, which are formed similarly to the strips 15, 16, 17 and 18 and also extend to the cutting edge of the blade, are made of the abrasion-resistant urethane. During operation the saw-tooth effect would be achieved as before, except that the strips of the principal body portion will wear faster to create this effect. This configuration provides an additional advantage in that it is possible to make the main portion of the blade of a cheaper material, and utilize the highly abrasion resistant strips in a limited area to reduce the cost thereby.

While the exact method of manufacturing this blade and its strips has been described herein, the same techniques as described in our above-referenced application may be followed; namely, preforming either the body or the strips, and casting the remainder around the preformed areas. It is, of course, possible to form the body with space left for the strips and simply cement the strips in place, using techniques which are known in the art.

Additional modifications in structure which are not illustrated are specifically contemplated herein. For example, the blade need not be limited to two arms but may have three, four or even more of such arms. The exact number, length, width, or spacing of the strips may also be varied within the scope of the invention.

We claim:
1. In a lawn mower having a rotatable shaft and a cutting blade mounted thereon, said blade having cutting sections including cutting edges, said sections principally formed of a first flexible material and having a plurality of longitudinally spaced strips of a second flexible material extending transversely of said blade and extending to said cutting edges, said strips having a width approximately equal to the spacing therebetween.
2. The blade of claim 1 in which one of said materials is a flexible urethane elastomer.
3. The blade of claim 2 in which the other of said materials is a flexible urethane elastomer having dissimilar properties.
4. The blade of claim 2 in which the other of said materials is a plastic.
5. The blade of claim 2 in which the other of said materials is a plastic selected from the group comprising polyethylene, polypropylene, polytsyrene, polycarbonate, polyimide, polyphenylene oxide, polyvinyl chloride, nylon, acetal, ABS, and blends thereof.
6. In a lawn mower having a rotatable shaft and a cutting blade mounted thereon said blade having cutting sections including cutting edges having a saw-tooth confiuration, said sections formed of alternating transversely extending longitudinally spaced strips of flexible materials having dissimilar abrasion resistance, each of said strips being approximately the same width.

References Cited

UNITED STATES PATENTS

| 3,133,398 | 5/1964 | Tatum | 56—295 |
| 3,156,082 | 11/1964 | Joyner | 56—295 |
| 3,214,896 | 11/1965 | Watkins et al. | 56—295 |
| 3,302,377 | 2/1967 | Ely | 56—295 |

ANTONIO F. GUIDA, Primary Examiner.

ABRAHAM G. STONE, Examiner.

P. A. RAZZANO, Assistant Examiner.